(12) United States Patent
Harasawa et al.

(10) Patent No.: US 7,066,766 B2
(45) Date of Patent: *Jun. 27, 2006

(54) FLASH MEMORY CARD CONNECTOR

(75) Inventors: Masaaki Harasawa, Kanagawa (JP);
Hironori Handa, Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 12 days.

This patent is subject to a terminal disclaimer.

(21) Appl. No.: 10/470,770

(22) PCT Filed: Jan. 29, 2002

(86) PCT No.: PCT/JP02/00629

§ 371 (c)(1),
(2), (4) Date: Dec. 31, 2003

(87) PCT Pub. No.: WO02/063725

PCT Pub. Date: Aug. 15, 2002

(65) Prior Publication Data

US 2004/0087211 A1 May 6, 2004

(30) Foreign Application Priority Data

Feb. 2, 2001 (JP) .............................. 2001-027231

(51) Int. Cl.
*H01R 24/00* (2006.01)
(52) U.S. Cl. .................................... 439/630
(58) Field of Classification Search ................ 439/331, 439/326, 630, 633, 677, 945, 327, 632; 361/784, 361/803

See application file for complete search history.

(56) References Cited

U.S. PATENT DOCUMENTS

| 5,224,873 | A | | 7/1993 | Duffet et al. |
| 5,337,220 | A | | 8/1994 | Granitz |
| 5,933,328 | A | * | 8/1999 | Wallace et al. ............. 361/737 |

(Continued)

FOREIGN PATENT DOCUMENTS

CN          1231556 A       10/1999

(Continued)

OTHER PUBLICATIONS

European Search Report, Appln. No. 02716437.5-2210-JP0200629, dated Mar. 16, 2005.

(Continued)

*Primary Examiner*—Phuong Dinh
(74) *Attorney, Agent, or Firm*—Rader, Fishman & Grauer PLLC

(57) ABSTRACT

A connector for connecting, to a mounting wiring board, a flash memory card having a signal connecting portion in the vicinity of its one edge is provided. The connector includes a connector main body having a card mounting space formed therein, a cover member, rotatably attached to one end of the connector main body, for restricting one end of the flash memory card in the card mounting space, a locking mechanism for locking the cover member in a closed state, a signal connection contact pressed against the signal connecting portion of the flash memory card and electrically connected to the mounting wiring board, and a restriction member for restricting the other end of the flash memory card in the card mounting space in the vicinity of the other end of the connector main body.

2 Claims, 3 Drawing Sheets

U.S. PATENT DOCUMENTS

| | | | |
|---|---|---|---|
| 6,062,887 A * | 5/2000 | Schuster et al. | 439/218 |
| 6,174,188 B1 | 1/2001 | Martucci | |
| 6,210,233 B1 | 4/2001 | Hoolhorst | |
| 6,386,920 B1 * | 5/2002 | Sun | 439/630 |
| 6,468,101 B1 * | 10/2002 | Suzuki | 439/326 |
| 6,623,304 B1 * | 9/2003 | Harasawa et al. | 439/630 |

FOREIGN PATENT DOCUMENTS

| | | |
|---|---|---|
| CN | 1048144 C | 1/2000 |
| CN | 1243989 A | 2/2000 |
| EP | 1 223 546 | 7/2002 |
| JP | 5-197842 | 8/1993 |
| JP | 5-197842 A | 8/1993 |
| JP | 05-197842 A1 | 8/1993 |
| JP | 9-270279 | 10/1997 |
| JP | 9-270279 A | 10/1997 |
| JP | 09-270279 A1 | 10/1997 |
| JP | 11-176516 | 7/1999 |
| JP | 11-185904 A | 7/1999 |
| JP | 11-307191 A1 | 11/1999 |
| JP | 2000-340281 A1 | 12/2000 |
| JP | 2000-340298 | 12/2000 |
| JP | 3078227 U | 3/2001 |
| JP | 2001-505696 A | 4/2001 |

OTHER PUBLICATIONS

European Search Report, Appln. No. 02 716 437.5-2210, dated May 27, 2005.

Chinese Office Action with English Translation, dated Jul. 8, 2005.

European Patent Office Examination Report, dated May 27, 2005.

Decision of Refusal, Reference No.: 104993, Dispatch No.: 415093, dated Nov. 8, 2005.

* cited by examiner

FLASH MEMORY CARD CONNECTOR

TECHNICAL FIELD

The present invention relates to a connector for a flash memory card that is used for mounting a flash memory card such as an SD card, a Smartmedia, a multimedia card, or a memory stick on a mounting wiring board of each type of equipment.

BACKGROUND ART

Flash memory cards are formed in card shapes in which memory chips are sealed in card type outer shells. Examples of the flash memory cards include ones meeting various standards such as an SD card, a multimedia card, a Smartmedia, a compact flash (CF) card, and a memory stick.

Information equipment such as a personal computer, particularly portable information equipment which is represented by a PDA (Personal Digital Assistant) and a portable telephone set may be provided a card slot for mounting a flash memory card in many cases. The card slot has a slot port exposed from a case of the equipment, and has a connector for electrical connection to the flash memory card arranged in its innermost part. The connector is so constructed that the flash memory card is insertable and extractable in a direction parallel to a mounting wiring board through the slot port.

In the connector of this construction, however, the flash memory card comes off the connector by shock in a case where the equipment is dropped by mistake. Further, the connector must be arranged in the outer periphery of the mounting wiring board, so that the degree of freedom of the arrangement is limited.

Furthermore, particularly in the portable telephone set, it is difficult to provide the slot port in the outer periphery of the case. There is a demand to attach an SD card or the like to a flat portion exposed by detaching a battery which is attached and detached to and from a rear surface, for example, of the portable telephone set.

DISCLOSURE OF INVENTION

An object of the present invention is to provide a connector for a flash memory card, which can increase the degree of freedom of arrangement.

Another object of the present invention is to provide a connector for a flash memory card, which can mount the flash memory card from a direction opposite to a mounting wiring board.

A connector for a flash memory card according to the present invention is a connector (10) for connecting, to a mounting wiring board, a flash memory card (100) having a signal connecting portion in the vicinity of its one edge, comprising a connector main body (1) having a card mounting space (3) formed therein; a cover member (5) rotatably attached to one end of the connector main body for restricting one end of the flash memory card in the card mounting space in a closed state where at least a part of the card mounting space is closed; a locking mechanism (54a, 56a, 17) for locking the cover member in the closed state with respect to the connector main body; a signal connection contact (2) having a contact portion (21) pressed against the signal connecting portion of the flash memory card and a connecting portion (22) electrically connected to the mounting wiring board at the other end opposite to the one end of the connector main body; and a restriction member (4) provided in the vicinity of the other end of the connector main body and engaged with the other end of the flash memory card for restricting the other end of the memory card in the card mounting space. Although an alphabetical character in parentheses represents a corresponding constituent element or the like in an embodiment, described later, this is not intended that the present invention should be interpreted by being limited to the present embodiment. The same is true in the following.

The above-mentioned restriction member may be one forming an outer shell, which is in a substantially "C" shape in cross section, receiving the other end of the flash memory card in corporation with the connector main body. The restriction member may be a component other than the connector main body, or may be one formed integrally with the connector main body.

The above-mentioned flash memory card is generally one having a memory chip sealed in its card type outer shell. Examples of the flash memory card include an SD card, a multimedia card, a Smartmedia, a memory stick, and a compact flash card.

According to the present invention, the flash memory card is mounted on the card mounting space in the connector main body, and has its one end restricted by locking the cover member to the connector main body and the other end restricted by the restriction member. By such construction, the flash memory card can be reliably held in the card mounting space. The restriction of the other end of the flash memory card by the restriction member makes it possible to reliably hold the electrical connection between the signal connection contact and the flash memory card. Consequently, high shock resistance can be realized.

Furthermore, the flash memory card can be mounted with the cover member in its opened state. Accordingly, the flash memory card can be mounted from a direction opposite to the mounting wiring board. Consequently, the connector need not be arranged in the outer periphery of the mounting wiring board, thereby making it possible to increase the degree of freedom of the arrangement of the connector.

The connector for a flash memory card may be for connecting, to the mounting wiring board, a flash memory card in a substantially rectangular shape with a cut-out formed at its one corner for preventing erroneous mounting (101). In this case, it is preferable that the card mounting space is formed in a substantially rectangular shape conforming to the flash memory card, and the connector main body has an erroneous mounting preventing portion (31) corresponding to the cut-out provided therein as projecting into the card mounting space.

According to the construction, the flash memory card can be prevented from being erroneously mounted by matching the erroneous mounting preventing portion projecting into the card mounting space and the cut-out of the flash memory card with each other. The card mounting space receives the flash memory card from the direction opposite to the mounting wiring board. Accordingly, an operator who tries to mount the flash memory card can visually recognize the erroneous mounting preventing portion before the mounting. Consequently, the operator can immediately recognize the correct mounting posture of the flash memory card and therefore, can quickly mount the flash memory card.

It is preferable that the cover member is formed of a metal. Consequently, heat generated from the flash memory card can be radiated to the surroundings through the cover member, and can also shield noises.

In order to obtain a good noise shielding effect, it is preferable that in the state where the cover member is closed, there is further provided a noise shielding connection member for connecting the cover member to a low impedance portion (a power supply portion or a ground portion) in the mounting wiring board.

If extending portions (54 to 57) for covering a part of the mounting space from the side are provided at the side of the cover member, the noise shielding effect can be increased.

It is preferable that the cover member comprises a spring piece pressed against an outer surface of the flash memory card.

By the construction, heat generated from the flash memory card can be radiated through a spring piece (e.g., one made of a metal integrally with the cover member).

It is preferable that a heat transfer member pressed against the cover member in the closed state of the cover member and joined to the mounting wiring board for forming a heat radiation path to the mounting wiring board is attached to the connector main body.

According to the construction, the heat generated from the flash memory card passes through the cover member made of a metal through the spring piece and is further transferred to the mounting wiring board through the heat transfer member (which may be a member also used as the noise shielding connection member). Consequently, the flash memory card can be effectively prevented from being overheated.

The foregoing and other objects, features, aspects and advantages of the present invention will become more apparent from the following detailed description of the present invention when taken in conjunction with the accompanying drawings.

BEST MODE FOR CARRYING OUT THE INVENTION

Figure 1:
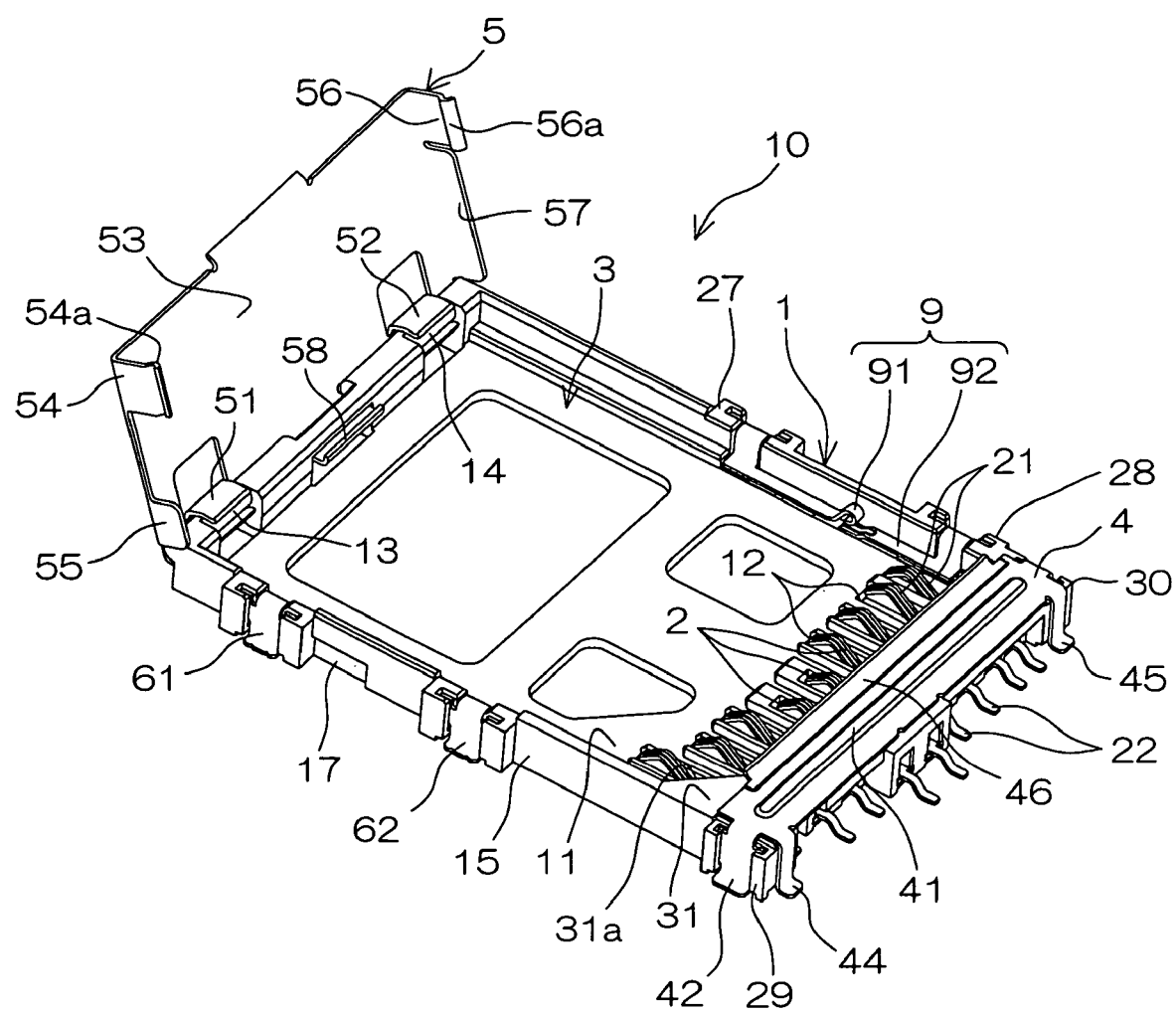
FIG. 1 is a perspective view showing the construction of a connector for a flash memory card according to an embodiment of the present invention.
Figure 2:
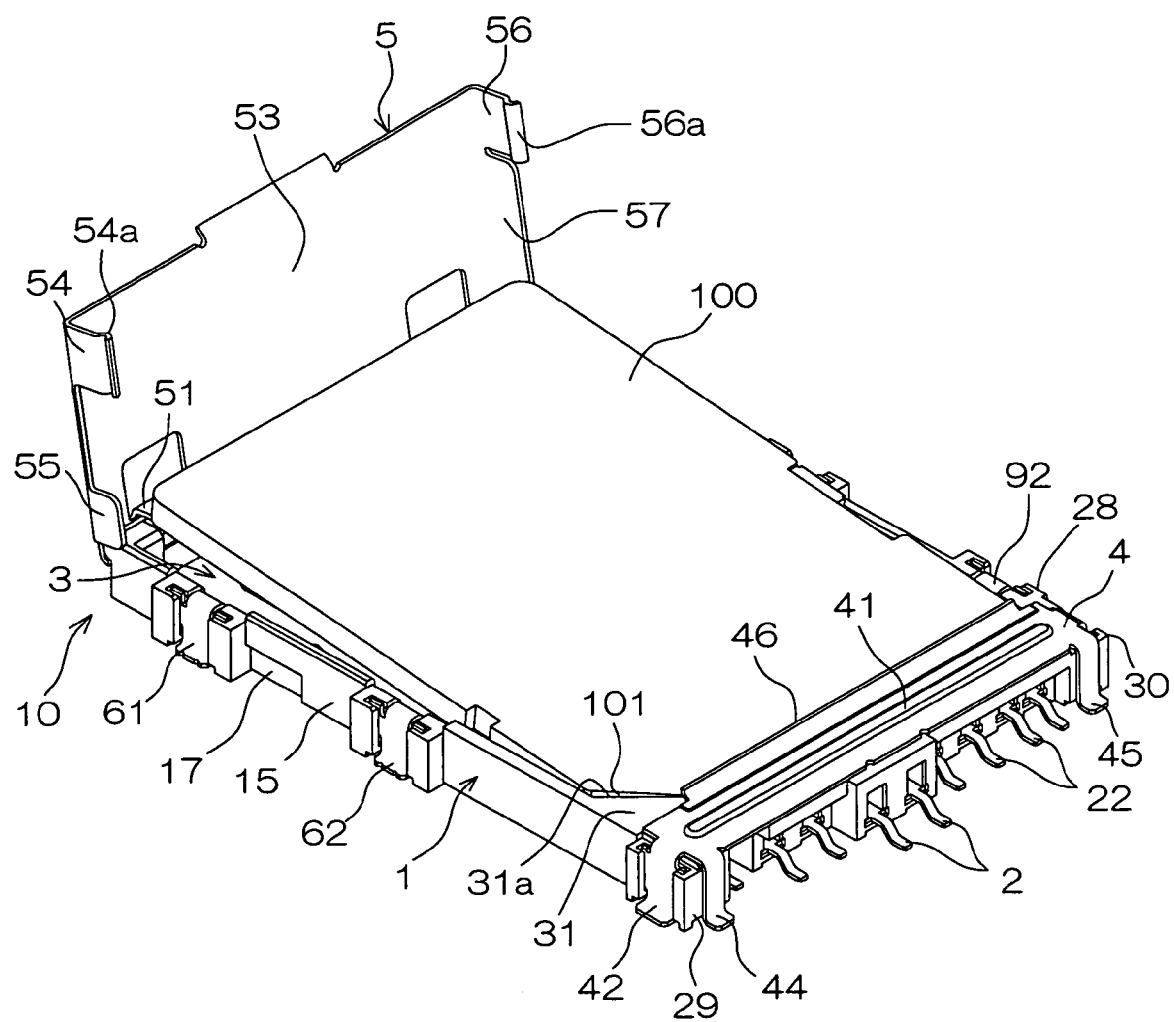
FIG. 2 is a perspective view showing the process of mounting a flash memory card on the connector.

FIG. 1 is a perspective view showing the construction of a connector for a flash memory card according to an embodiment of the present invention, and FIG. 2 is a perspective view showing how an SD card which is an example of a flash memory card is being mounted on the connector. The connector for a flash memory card 10 is a connector for mounting the SD card 100 on a mounting wiring board of equipment which is represented by a portable telephone set, a notebook personal computer, a digital household appliance, and so on.

The connector 10 comprises a connector main body 1 to be mounted on the mounting wiring board of the equipment and a cover member 5 coupled to the connector main body 1 so as to be capable of being freely opened or closed. The connector main body 1 is composed of a formed product or molded article made of a synthetic resin material, and has a substantially rectangular frame shape as viewed from the top. A plurality of (nine in the present embodiment) contacts 2 made of a metal material having elasticity are provided side by side in the vicinity of one short side of the connector main body 1.

Each of the contacts 2 has a contact portion 21 projecting from a bottom wall 11 for defining a card mounting space 3 inside the connector main body 1 and a connecting portion 22 connecting with the contact portion 21 and projecting along the length of the connector main body 1 in the vicinity of one edge of the connector main body 1. The connecting portion 22 is arranged so as to be substantially flush with a bottom surface of the connector main body 1 (a surface opposite to the mounting wiring board of the equipment). Each of the connecting portions 22 is to be joined to the mounting wiring board of the equipment with solder.

The contact portion 21 is fitted in a slit 12 formed in the bottom wall 11, to project so as to have a substantially circular arc shape upward from the bottom wall 11. A plurality of slits 12 are formed parallel to one another along the length of the connector main body 1. The two slits 12 disposed around the center in the width of the connector main body 1 are formed with their positions shifted by a predetermined distance outward in the card mounting space 3 along the length of the connector main body 1. Further, one of the slits 12 at one end in the width of the connector main body 1 is formed with its position shifted by a predetermined distance inward in the card mounting space 3 along the length of the connector main body 1. The arrangement of the contact portion 21 of each of the contacts 2 corresponds to the above-mentioned arrangement of the slit 12.

An SD card 100 is formed in a substantially rectangular card shape. A cut-out 101 for preventing erroneous mounting is formed at one corner of the SD card 100. Correspondingly, an erroneous mounting preventing portion 31 projecting into the card mounting space 3 is integrally formed at a position corresponding to the cut-out 101 in the vicinity of an edge, on the side of the contact 2, of the connector main body 1. The cut-out 101 has a shape obtained by obliquely cutting out the one corner of the SD card 100. Correspondingly, the erroneous mounting preventing portion 31 projects toward the one corner of the substantially rectangular card mounting space 3 as viewed from the top, and has a restriction surface 31a in a shape obtained by obliquely cutting the corner. By the construction, the SD card 100 can be reliably prevented from being erroneously mounted.

A restriction member 4 for restricting one end of the SD card 100 mounted on the card mounting space 3 is attached to the edge, on the side of the contact 2, of the connector main body 1 by being pressed into press-fitting portions 29 and 30 formed on both side surfaces 15 of the connector main body 1. Consequently, an outer shell, which is in a substantially "C" shape in cross section, receiving the one end of the SD card 100 is formed at one end of the card mounting space 3.

The restriction member 4 is mead of a metal material in this embodiment, and comprises a flat plate-shaped restricting portion 41 on one end of the SD card 100 mounted on the card mounting space 3, a hanging portion 42 hanging along a side surface 15 of the connector main body 1 from both ends of the restricting portion 41, and other hanging portions 44 and 45 similarly hanging along an end surface of the connector main body 1 in the vicinity of both ends of the restricting portion 41. The ends of the hanging portions 42, 44, and 45 are bent and formed in an L shape along the mounting wiring board of the equipment, and are to be joined to the mounting wiring board with solder.

In the connector main body 1, a pair of cover member mounting shafts 13 and 14 coupled to the cover member 5 so as to be rotatable is formed on an edge on the opposite side of the contact 2. The cover member mounting shafts 13 and 14 are formed with spacing along a short side of the connector main body 1. Rotatable mounting portions 51 and 52 in the cover member 5 are engaged with the cover member mounting shafts 13 and 14 so as to be rotatable.

The cover member 5 is formed by processing a metal plate, and comprises a main body portion 53 covering a part of the card mounting space 3 in the connector main body 1, the above-mentioned rotatable mounting portions 51 and 52 formed by raising a part of a rotatable base end of the main body portion 53 and subjecting the raised portion to formation processing, a pair of hanging portions (reinforcing tubs) 54 and 55 and a pair of hanging portions 56 and 57, which are respectively formed at both sides of the main body portion 53, and a receiving portion 58 receiving an end of the SD card 100. The receiving portion 58 is formed by subjecting an edge on the side of a rotating axis of the cover member 5 to bending processing, and is inserted through a through hole formed in the connector main body 1 in the opened state of the cover member 5, to project into the card mounting space 3.

Figure 3:
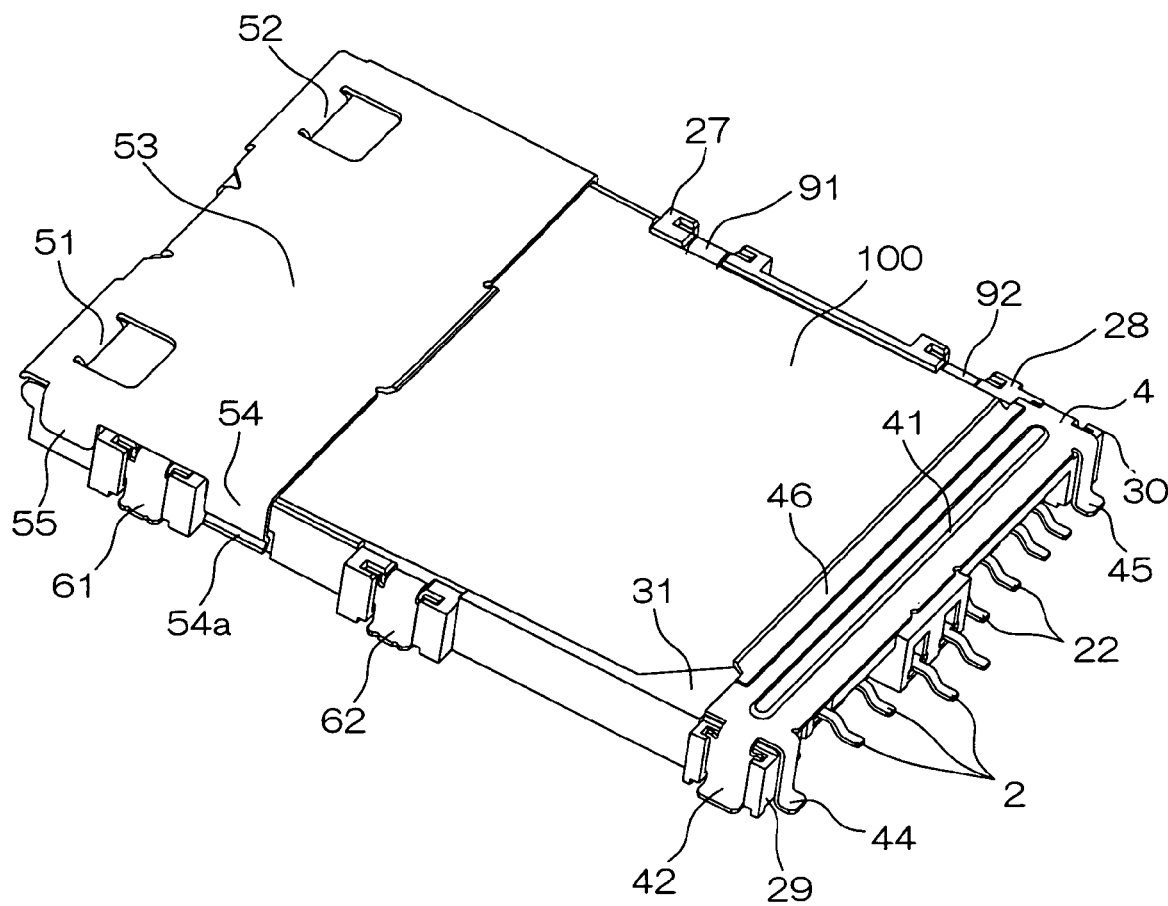
FIG. 3 is a perspective view showing a state where a cover member is closed.

The hanging portions 54 to 57 assume a posture where they hang along the side surface of the connector main body 1 when the cover member 5 is rotated from a state shown in FIG. 1 to a state shown in FIG. 3 to enter a closed state where a part of the card mounting space 3 is closed.

Locking portions 54a and 56a for holding the closed state of the cover member 5 are formed at ends of the pair of hanging portions 54 and 56, positioned near the center of the card mounting space 3 in the closed state of the cover member 5, out of the hanging portions 54 to 57. The locking portions 54a and 56a project toward the card mounting space 3 in the closed state of the cover member 5, and form a cylindrical curved surface along the length of the connector main body 1.

Locking recesses 17 with which the locking portions 54a and 56a are respectively engaged are formed on both side surfaces of the connector main body 1. When the cover member 5 is led to the closed state by being rotated so as to be in close proximity to the connector main body 1, the locking portions 54a and 56a are respectively engaged with the locking recesses 17. Consequently, the cover member 5 is locked in the closed state.

Fixing tubs 61 and 62 are pressed into a side surface portion of the connector main body 1. The fixing tubs 61 and 62 are to be joined to the mounting wiring board with solder, thereby firmly fixing the connector main body 1 to the mounting wiring board.

In the card mounting space 3, a switching member 9 for detecting the presence or absence of the mounting of the SD card 100 is arranged at a position near the one side surface 15 of the connector main body 1. The switching member 9 comprises a pair of contacts 91 and 92 each composed of a metal piece having elasticity. Base ends of the contacts 91 and 92 are respectively pressed into contact press-fitting portions 27 and 28 formed so as to project from the side surface 15 of the connector main body 1. The base ends of the contacts 91 and 92 hang along the side surface 15 of the connector main body 1, to reach the vicinity of the bottom surface of the connector main body 1. The base ends are respectively joined to wiring patterns on the mounting wiring board with solder.

In the present embodiment, when the SD card 100 is mounted on the card mounting space 3, the one contact 91 is elastically deformed and is brought into contact with the other contact 92 so that the switching member 9 becomes conductive. Unless the SD card 100 is mounted on the card mounting space 3, a space between the contacts 91 and 92 is held in an interrupted state. Consequently, the conduction/interruption of the switching member 9 is detected on the side of the equipment, thereby making it possible to detect the presence or absence of the mounting of the SD card 100.

The SD card 100 is mounted on the card mounting space 3 in a posture where a metal terminal portion serving as a signal connecting portion is opposed to the contact 2, as shown in FIG. 2. More specifically, the SD card 100 is mounted on the card mounting space 3 by matching the cut-out 101 with the erroneous mounting preventing portion 31, so that the metal terminal portion is positioned on the side of the contact 2, and its end on the side of the metal terminal portion (that is, on the side of the cut-out 101) is inserted into a space between the restriction member 4 and the bottom wall 11. A guiding portion 46 formed so as to be curved upward is provided at an edge, on the side of the card mounting space 3, of the restriction member 4. The guiding portion 46 smoothly guides one end of the SD card 100 inserted obliquely from above into a space below the restriction member 4. The card mounting space 3 is opened in a direction opposite to the mounting wiring board. Accordingly, an operator who tries to mount the SD card 100 can easily visually recognize the erroneous mounting preventing portion 31 before the mounting. Consequently, the operator can immediately know the correct mounting posture of the SD card 100. Therefore, the operator can quickly mount the SD card 100 even if he or she is an inexperienced operator.

After the one end of the SD card 100 is inserted into the space between the restriction member 4 and the bottom wall 1, the other end of the SD card 100 is pressed into the card mounting space 3. At this time, the other end of the SD card 100 abuts against the receiving portion 58 formed at the end on the side of the rotating axis of the cover member 5. When the SD card 100 is further pressed into the card mounting space 3 from this state, a moment in the closing direction is applied to the cover member 5 through the receiving portion 58 from the SD card 100. Consequently, the cover member 5 starts to be rotated in the closing direction as an operation for mounting the SD card 100 is performed. After the SD card 100 is pressed into the card mounting space 3, the operator further rotates the cover member 5 in the closing direction, to respectively engage the locking portions 54a and 56a with the locking recesses 17. Consequently, a closed state shown in FIG. 3 occurs.

In this state, the metal terminal portion of the SD card 100 elastically abuts against the contact portion 21 of the contact 2. The one end of the SD card 100 is restricted by the restriction member 4, and the cover member 5 is locked in the closed state, so that the abutting state is held.

Although description has been made of one embodiment of the present invention, the present invention can be also embodied in another embodiment. For example, although in the above-mentioned embodiment, the cover member 5 is made to have such dimensions as not to cover the whole of the card mounting space 3 but to cover only a partial space in the vicinity of an end on the opposite side of the contact 2, a cover member having such dimensions as to cover the whole region of the card mounting space 3 may be used. In order to open and close the large cover member, a large space must be ensured. In a case where an opened or closed space for the cover member is restricted, therefore, it is preferable that the small cover member 5 shown in the above-mentioned embodiment is used.

At a position, corresponding to the hanging portion 54 or 56 in the cover member 5, in the connector main body 1, there may be provided a heat transfer member made of a metal which is locking engageable with the hanging portion 54 or 56. A locking portion which is locking engageable with the hanging portion 54 may be provided in the fixing tub 61 and arranged at the above-mentioned position to be used as a heat transfer member. Heat generated from the SD card 100 can be radiated through the cover member 5 and the heat transfer member by joining the heat transfer member to the mounting wiring board with solder.

In order to effectively radiate the heat generated from the SD card 100, it is preferable that a part of the main body portion 53 is raised to form a heat radiating tongue piece in the vicinity of an end, on the opposite side of the rotatable mounting portions 51 and 52, of the cover member 5. It is preferable that the heat radiating tongue piece has spring characteristics, projects into the card mounting space 3 in a state where the cover member 5 is closed, and elastically abuts against the outer surface of the SD card 100. Consequently, the heat generated from the SD card 100 is transferred to the heat radiating tongue piece and is radiated to the air from the main body portion 53, or is transferred to the mounting wiring board through the hanging portion 54 or 56 and the heat transfer member and is radiated.

It is preferable that the above-mentioned heat radiation member is joined to a metal portion of the mounting wiring board, for example, a wide wiring pattern to be a ground potential with solder. Consequently, the cover member 5 made of a metal material can have a noise shielding function. That is, externally applied electromagnetic noises with respect to the SD card 100 to be positioned inside the cover member 5 can be shielded by the cover member 5. Although the cover member 5 is provided with the hanging portions 54 to 57, the hanging portions 54 to 57 can contribute to the increase in the noise shielding function by covering the card mounting space 3 from the side.

When a large cover member for covering nearly the whole area of the card mounting space 3 is used, a large heat radiating effect can be expected. Moreover, external noises can be effectively shielded.

Although the present invention has been described and illustrated in detail, it is clearly understood that the same is by way of illustration and example only and is not to be taken by way of limitation, the spirit and scope of the present invention being limited only by the terms of the appended claims.

This application corresponds to Japanese Patent Application No. 2001-27231 filed with the Japanese Patent Office on Feb. 2, 2001, the disclosure of which is incorporated here into by reference.

What is claimed is:

1. A connector for connecting, to a mounting wiring board, a flash memory card having a signal connecting portion in the vicinity of one edge thereof, the connector comprising:

a connector main body having a card mounting space formed therein;

a cover member, rotatably attached to one end of the connector main body, for restricting one end of the flash memory card in the card mounting space in a closed state where at least a part of the card mounting space is closed;

a locking mechanism for locking the cover member in the closed state with respect to the connector main body;

a signal connection contact having a contact portion to be pressed against the signal connecting portion of the flash memory card and a connecting portion electrically connected to the mounting wiring board at the other end opposite to the one end of the connector main body; and a restriction member provided in the vicinity of the other end of the connector main body and engaged with the other end of the flash memory card for restricting the other end of the flash memory card in the card mounting space.

2. The connector for a flash memory card according to claim 1, wherein the connector is for connecting, to the mounting wiring board, a flash memory card in a substantially rectangular shape with a cut-out formed at one corner thereof for preventing erroneous mounting, the card mounting space is formed in a substantially rectangular shape conforming to the flash memory card, and the connector main body has an erroneous mounting preventing portion corresponding to the cut-out and projecting into the card mounting space.

* * * * *